Dec. 6, 1932.          R. E. LINN          1,890,123
TIRE COVER
Filed June 3, 1932
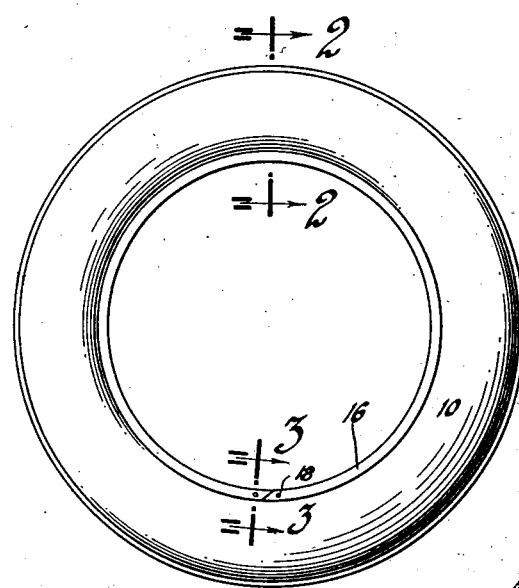
Fig.1
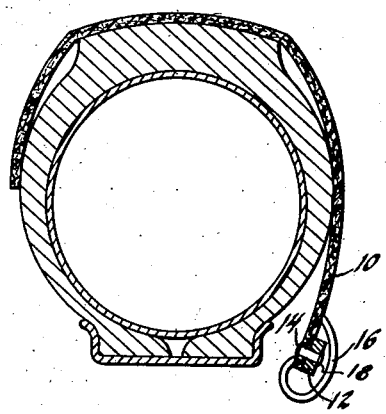
Fig.2
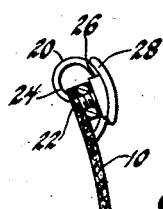
Fig.3
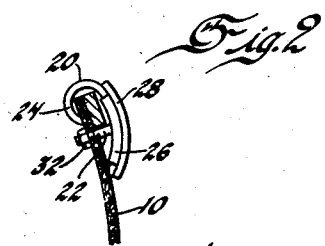
Fig.5
Fig.6
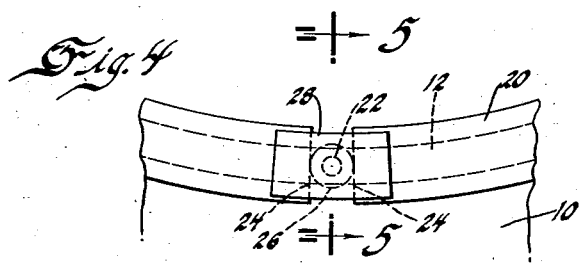
Fig.4
INVENTOR
Robert E. Linn
BY
ATTORNEY Patented Dec. 6, 1932

1,890,123

UNITED STATES PATENT OFFICE

ROBERT R. LINN, OF DETROIT, MICHIGAN

TIRE COVER

Application filed June 3, 1932. Serial No. 615,188.

This invention relates to tire covers and more particularly to means for stiffening, binding, protecting and ornamenting the circular inner edge of the face ring of a tire cover.

The principal object of this invention is to provide a tire cover having a face ring of rigid, form sustaining, material, preferably, though not necessarily, of a composition disclosed and described in my copending application Serial No. 611,620, filed May 16, 1932, the inner edge of the face ring being provided with a metallic molding, substantially as disclosed in another copending application, Serial No. 573,241, filed November 5, 1931, of which the instant application is a continuation in part.

Still further objects of the invention will become readily apparent upon reference to the following detailed description of preferred embodiments of the invention and to the appended drawing, in which—

Figure 1 shows a tire cover of the invention;

Figs. 2 and 3 are transverse sections as if on lines 2—2 and 3—3 of Figure 1;

Fig. 4 shows, to enlarged scale, a portion of another tire cover of the invention;

Fig. 5 is a transverse section as if on line 5—5 of Figure 4; and

Fig. 6 is a modified form of the parts shown in Fig. 5.

Referring to the drawing, it will be seen that there is disclosed in Figs. 1 and 2, a tire cover having a face ring 10 made of a rigid, form-sustaining material, which is preferably, though not necessarily, of the nature disclosed in my application Serial No. 611,620, filed May 16, 1932. One of the characteristics of a tire cover face ring made of this material is that its inner edge is subject to deformation and shredding. This characteristic is also true, to a lesser extent however, of tire covers made of thin sheet metal where deformation and edge splitting often occurs.

In order to reinforce the inner circular edge of the face ring, there is provided on such edge a welt 12 secured thereto by rivets 14, although it will be understood that other suitable means of securing such welt to the edge may be used if desired. For concealing the welt, and also for receiving, protecting, binding and ornamenting the inner circular edge of the face ring, there is provided a channeled molding 16 preferably, though not necessarily, of the cross section disclosed, other channel cross sections being found useful in this connection. For example, the molding might be so cross sectioned as to hook around welt 12 and be in actual interlocking engagement with the same.

Various methods of securing the molding 16 to the face ring 10 may be suggested and several such methods are disclosed. One, and perhaps the simplest method, is to make the channel 16 of such form, temper, and material that it will have an inherent tendency to expand as it is snapped into place on the inner edge, the channel receiving the welt 12 and such inner edge. This method is shown in my copending application Serial No. 573,241 and for this reason the instant application is truly a continuation in part of the latter.

If desired, rivets 18 may be used, as in Fig. 3, to secure ring 16 at its ends to the faces.

Another method of securing the channel ring 16 to the face ring 10 is to make the channel of such a form, material and temper, that it will have a tendency to contract. In such a case the molding, which is designated by the reference 20, Figure 4, normally has a diameter slightly less than the diameter of the inner edge of the face ring and must be expanded, when applied to the face ring, to assume the position of Figure 4. For maintaining the channel ring 20 expanded, means in the nature of a screw bolt 22 is threaded through the welt 12 and the face ring 10 and between the ends 24 of the channel 20. A shoulder 26 on the bolt is engaged by the ends 24 of the channel ring and tends to maintain the channel expanded. The bolt may, if desired, be provided with a medallion head 28 of ornamental characteristics which overlaps and conceals the ends of the face ring and which also serves to conceal the working parts of the bolt and to protect the entire construction at this point. If desired the bolt 22 may have a nut 32, as in Fig. 6.

A third method of securing a channel to the edge of a face ring of a tire cover would be to provide the ring 20 of Figure 4 with an inherent tendency to expand, in which case the bolt 22 would be used to lock the molding in place on the face ring. In such a modification, when it is desired to remove the channel, it would be necessary first to remove the bolt 22 and then manually pull the channel ring 20 off the face ring. This is not true of a construction wherein a normally contracted molding is employed, for in this latter construction the molding, once released by the removal of bolt 22, would tend to remove itself from the face ring 10.

Other methods of securing the channel ring to the face ring might be suggested and specific mention of these will not at this time be attempted.

Now having described the invention and a preferred embodiment thereof, reference will be had to the following claims which alone define and limit the invention, and it will be understood that the same is not to be limited to the specific details and constructions herein shown.

What I claim is:—

1. A tire cover or the like having a substantially planar face ring of rigid, form sustaining material, whose inner edge is complete and substantially circular, and a molding receiving, binding, protecting and ornamenting said inner edge, comprising a channeled split ring of metal or the like having its channel opening radially outwardly and having an inherent tendency to expand radially as it is snapped into place on said inner edge.

2. A tire cover or the like having a substantially planar face ring of rigid, form sustaining material, whose inner edge is complete and substantially circular and subject to deformation, and a molding receiving, binding, protecting and ornamenting said inner edge comprising a channeled split ring of metal or the like having its channel opening radially outwardly and having an inherent tendency to expand radially as it is snapped into place on said inner edge.

3. A tire cover or the like having a substantially planar face ring of rigid, form sustaining material, whose inner edge is complete and substantially circular and subject to edge splitting, and a molding receiving, binding, protecting and ornamenting said inner edge comprising a channeled split ring of metal or the like having its channel opening radially outwardly and having an inherent tendency to expand radially as it is snapped into place on said inner edge.

4. A tire cover or the like having a substantially planar face ring of rigid, form sustaining material, whose inner edge is complete and substantially circular and subject to deformation and edge splitting, and a molding receiving, binding, protecting and ornamenting said inner edge comprising a channeled split ring of metal or the like having its channel opening radially outwardly and having an inherent tendency to expand radially as it is snapped into place on said inner edge.

5. A tire over or the like having a substantially planar face ring of rigid, form sustaining material, whose inner edge is complete and substantially circular, and a molding receiving, binding, protecting and ornamenting said inner edge comprising a channeled split ring of metal or the like having its channel opening radially outwardly and having an inherent tendency to contract radially as it is snapped into place on said inner edge.

6. A tire cover or the like having a substantially planar face ring of rigid, form sustaining material, whose inner edge is complete and substantially circular, a molding receiving, binding, protecting and ornamenting said inner edge comprising a channeled split ring of metal or the like having its channel opening radially outwardly and having an inherent tendency to contract radially as it is snapped into place on said inner edge, and means for preventing contraction of said ring to a degree sufficient to permit of its separation from said edge.

7. A tire cover or the like having a substantially planar face ring of rigid, form sustaining material, whose inner edge is complete and substantially circular, and a molding receiving, binding, protecting and ornamenting said inner edge comprising a channeled split ring of metal or the like having its channel opening radially outwardly and having an inherent tendency to contract radially as it is snapped into place on said inner edge, and means comprising a bolt, rivet or the like passed through said face ring near the edge thereof, and disposed between the ends of the molding ring, for preventing a contraction of said ring to a degree sufficient to permit of its separation from said edge.

8. A tire cover or the like having a substantially planar face ring of rigid, form sustaining material, whose inner edge is complete and substantially circular, a molding receiving, binding, protecting and ornamenting said inner edge comprising a channeled split ring of metal or the like having its channel opening radially outwardly and having an inherent tendency to expand radially as it is snapped into place on said inner edge, and auxiliary means for maintaining the molding ring expanded.

9. A tire cover or the like having a substantially planar face ring of rigid, form sustaining material, whose inner edge is complete and substantially circular, a molding receiving, binding, protecting and ornamenting said inner edge comprising a channeled split ring of metal or the like having its channel opening radially outwardly and having an inherent tendency to expand radially as it is snapped into place on said inner edge, and auxiliary means for maintaining the molding ring expanded, said means comprising a bolt, rivet or the like passed through said face ring near the edge thereof, and disposed between the ends of the molding ring.

10. A tire cover or the like having a substantially planar face ring of rigid, form sustaining material, whose inner edge is complete and substantially circular, a molding receiving, binding, protecting and ornamenting said inner edge comprising a channeled split ring of metal or the like, having its channel opening radially outwardly and having an inherent tendency to contract radially as it is snapped into place on said inner edge, and means for preventing contraction of said ring to a degree sufficient to permit of its separation from said edge, said means comprising a bolt passed through said face ring near the edge thereof, and disposed between the ends of the molding ring, the bolt, rivet or the like having a head overlying adjacent ends of the ring.

11. A tire cover or the like having a substantially planar face ring of rigid, form sustaining material, whose inner edge is complete and substantially circular, a molding receiving, binding, protecting and ornamenting said inner edge comprising a channeled split ring of metal or the like having its channel opening radially outwardly and having an inherent tendency to expand radially as it is snapped into place on said inner edge, and auxiliary means for maintaining the molding ring expanded, said means comprising a bolt, rivet or the like passed through said face ring near the edge thereof, and disposed between the ends of the molding ring, the bolt having a head overlying adjacent ends of the ring.

12. A tire cover or the like having a substantially planar face ring or rigid, form sustaining, material, having a complete and substantially circular edge, and a molding receiving, surrounding, binding, protecting and ornamenting said edge comprising a resilient deeply channel split ring of metal or the like having its channel opening in a radial direction with the mouth of the channel radially remote from the web thereof, and with the flanges of the channel substantially planar, and having an inherent tendency to spring radially as it is snapped into place on and receives said edge in order to lock and secure itself on said edge by its own resiliency and the rigidity of the edge.

In testimony whereof I affix my signature.

ROBERT E. LINN.